United States Patent [19]

Skjaeveland

[11] Patent Number: 4,526,237
[45] Date of Patent: Jul. 2, 1985

[54] MULTI-FURROW PLOW ASSEMBLY WITH ADJUSTABLE PLOWSHARE MOUNTS

[75] Inventor: Magne Skjaeveland, Kvernaland, Norway

[73] Assignee: Kverneland A/S, Kvernaland, Norway

[21] Appl. No.: 492,129

[22] Filed: May 6, 1983

[30] Foreign Application Priority Data

Jun. 28, 1982 [NO] Norway .................................. 822177

[51] Int. Cl.³ ............................................. A01B 65/02
[52] U.S. Cl. .................................... 172/647; 172/283
[58] Field of Search ............... 172/221, 283, 287, 569, 172/576, 647

[56] References Cited

U.S. PATENT DOCUMENTS 4,098,346  7/1978  Stanfill et al. ...................... 172/283

FOREIGN PATENT DOCUMENTS 481234  2/1952  Canada ................................ 172/647

Primary Examiner—Richard T. Stouffer
Attorney, Agent, or Firm—Schwartz, Jeffery, Schwaab, Mack, Blumenthal & Evans

[57] ABSTRACT

An agricultural implement wherein a plurality of cultivators such as plowshares are attached to mounts (7) on a frame (1) which can be adjusted for different plow strip widths by a hydraulic cylinder (15) and a parallel strut (10), the frame (1) being pivotally attached (3) to a drag beam (4) that is adapted to be pivotally mounted (5) on a tractor hitch (6) for coupling to a tractor. A first link (12) is provided which is pivotally attached (13) to the tractor hitch (6) and to the frame (1), such that when the frame (1) is pivoted for changing the plow strip width, all of the plowshare mounts (7) will be displaced correctly in relation to each other while at the same time the first mount (7) is displaced correctly in relation to the tractor centerline. A second link (20) is also provided, pivotally attached (19, 21) to the strut (10) and the tractor hitch (6), such that when the frame (1) is pivoted for changing the strip width, all of the plowshare mounts (7) are pivoted in relation to the frame (1) such that the mounts (7) are always oriented in the same way and correctly in relation to the direction of driving.

4 Claims, 2 Drawing Figures

MULTI-FURROW PLOW ASSEMBLY WITH ADJUSTABLE PLOWSHARE MOUNTS

The present invention relates to an agricultural implement, especially a multi-furrow plow.

Multi-furrow plows which are infinitely adjustable (stepless adjustment) for varying the width of strip plowed are known previously, but an unresolved problem with the prior art plows of this type is that of obtaining proper adjustment of the forwardmost plowshare in relation to the centerline of the tractor while simultaneously ensuring that the furrow made by the first plowshare is spaced the same distance from the free plow furrow of the preceding plow strip as the distance between the other plow furrows.

The object of the invention is to provide an assembly on an agricultural implement, especially a multi-furrow plow, whereby the implement is infinitely adjustable such that the furrow made by the first plowshare is spaced the same distance from the free furrow of the preceding plow strip as the distance between the other furrows, no matter what furrow spacing is set.

This object is obtained with the features recited in the appurtenant patent claims.

An exemplary embodiment of the invention is illustrated schematically in the accompanying drawings, wherein.

Figure 1:
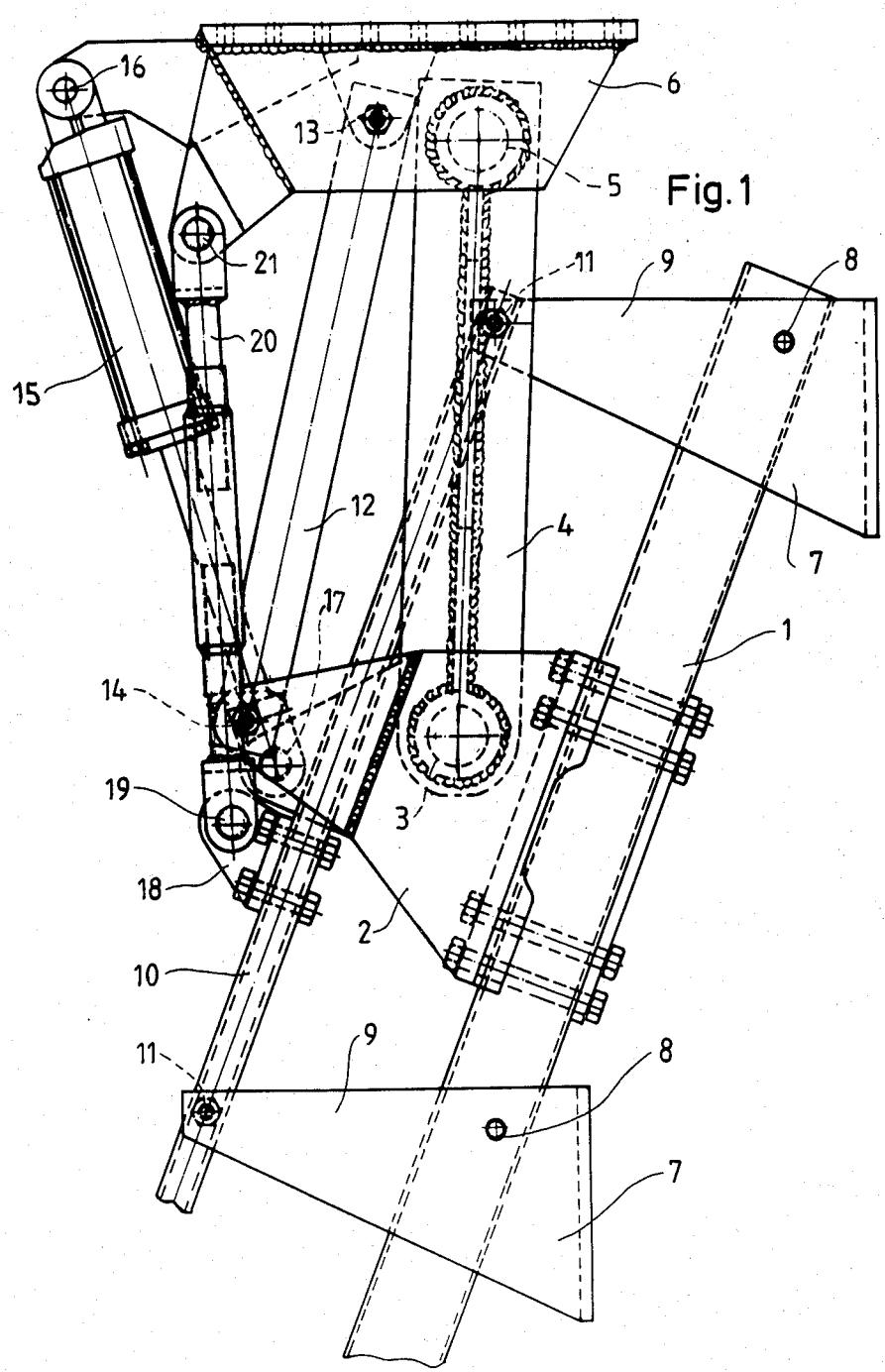
FIG. 1 shows the forward part of a multi-furrow plow including the assembly in accordance with the invention, seen in plan view, set for a narrow plow strip.
Figure 2:
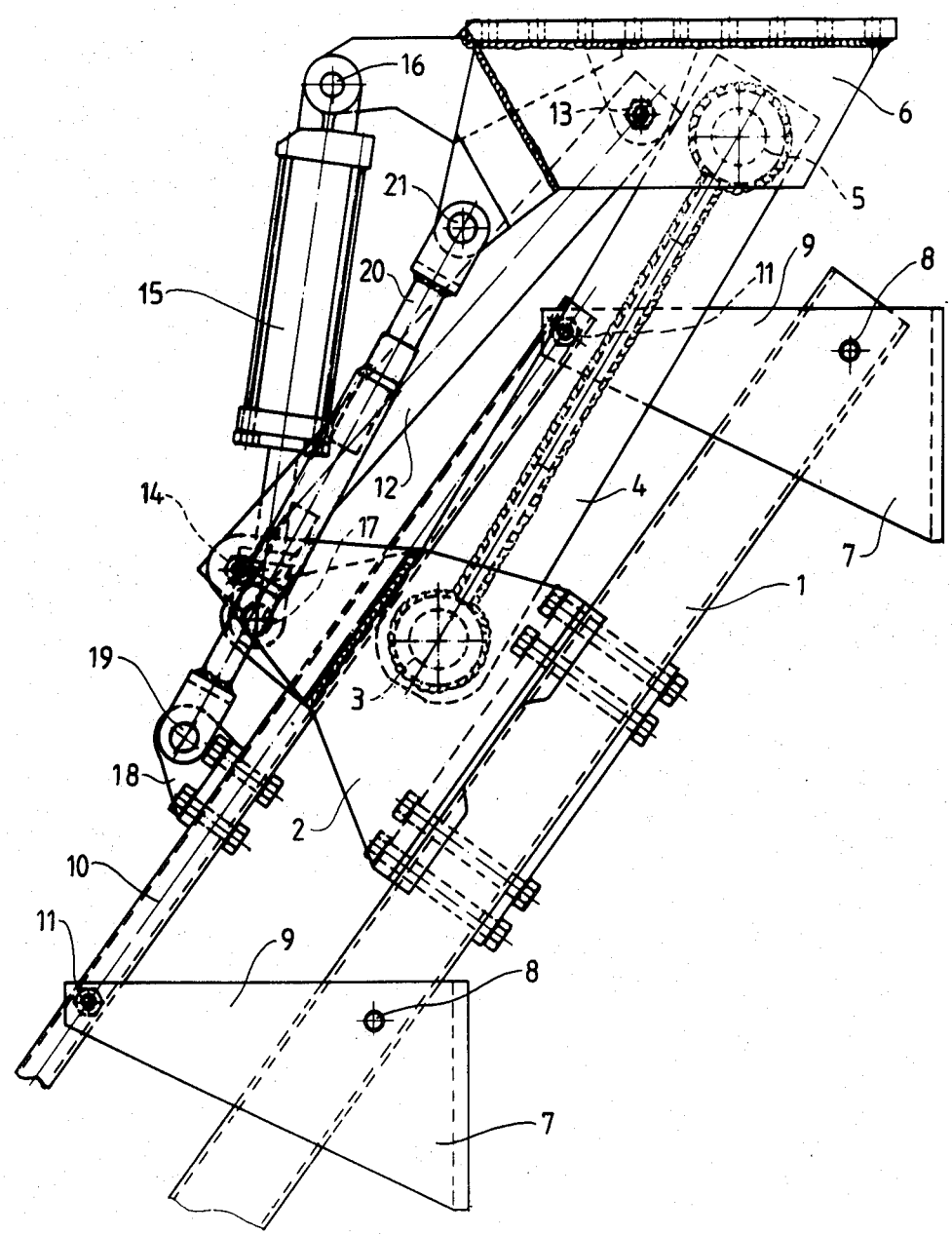
FIG. 2 shows the assembly of FIG. 1 set for a wide plow strip.

In the drawings, the plow frame 1 consists of a rectangular pipe. Screwed to the frame 1 is a first bracket 2 which by means of a first bolt 3 is pivotally attached to the rearward end of a drag beam 4. The front end of the beam 4 is pivotally mounted by means of a second bolt 5 on a tractor hitch 6 adapted for coupling to a tractor (not shown in the drawings).

A plurality of plowshare mounts 7, each adapted to have a plowshare fastened thereto with screws (plowshares not shown in the drawings), are pivotally attached with equidistant spacing to the plow frame 1 by means of third bolts 8. The plowshare mount 7 is formed with an arm 9 which at the free end thereof is pivotally fastened to a parallel strut 10 by means of fourth bolts 11.

A first link 12 which at one end thereof is pivotally fastened to the tractor hitch 6 by means of a fifth bolt 13 and at the other end is pivotally fastened to the first bracket 2 by means of a sixth bolt 14, is so arranged in relation to the rest of the construction that when a hydraulic cylinder 15, which at one end is pivotally attached to the tractor hitch 6 by means of a seventh bolt 16 and at the other end is pivotally attached to the first bracket 2 by means of an eighth bolt 17, is actuated for stepless adjustment of the plow frame 1 at whatever plow strip width is desired, all of the plowshare mounts 7 will be displaced correctly in relation to each other while at the same time the first plowshare mount 7, which is located nearest the tractor, is displaced correctly in relation to the centerline of the tractor.

Fastened with screws onto the strut 10 is a second bracket 18 which by means of a ninth bolt 19 is pivotally attached to one end of a turnbuckle 20. The other end of the turnbuckle 20 is pivotally attached to the tractor hitch 6 by means of a tenth bolt 21.

The turnbuckle 20 and the strut 10 ensure that when the plow frame 1 is being adjusted to whatever plow strip width is desired, the plowshare mounts 7 will be pivoted in such manner in relation to the plow frame 1 and the strut 10 that the mounts 7 will always be oriented correctly and in the same way in relation to the plowing direction.

As may be seen in the drawings, the bolts 3, 5, 13 and 14 form four points of rotation or corners of a quadrangle whose construction determines the correct displacement of the first plowshare mount 7 when the plow frame 1 is being adjusted for setting the desired plow strip width. The above quadrangle is determined in the following manner: The placement of three of the corners of the quadrangle are selected, i.e., the placement of the bolts 3, 5, and 14. The placement of the fourth corner of the quadrangle, i.e., the placement of the bolt 13, is determined first by noting the positions of the bolt 14 when the plow is correctly adjusted manually for the smallest, widest and intermediate strip widths. When the plow is being set for these different strip widths, the bolt 14 will describe an arc. The bolt 13 should be placed in the center of the circle of which the abovementioned arc forms a part. This center is found at the point of intersection between a perpendicular on the center of the chord between the extreme positions of the bolt 14 and a perpendicular on the center of the chord between one of the extreme positions of the bolt 14 and the center position of the bolt 14.

The placement of the turnbuckle 20 between the tractor hitch 6 and the parallel strut 10 determines the orientation of the plowshare mounts 7 when the plow frame 1 is being adjusted for different plow strip widths, ensuring that the plowshare mounts 7 are pivoted in relation to the plow frame 1 and the strut 10 such that the mounts 7 are always oriented in the same way and correctly in relation to the plowing direction. The positioning of the turnbuckle 20 is determined in the following manner after the positions of the bolts 3, 5, 13, 14 have been determined: The placement of the point of connection of the turnbuckle 20 to the strut 10 is selected, i.e., the placement of the bolt 19. The placement of the point of connection of the turnbuckle 20 to the tractor hitch 6, i.e., the placement of the bolt 21, is determined by first noting the positions of the bolt 19 when the plow is correctly adjusted manually for the smallest, widest and intermediate plow strip widths. When the plow is being adjusted for these different strip widths, the bolt 19 will describe an arc. The bolt 21 should be placed in the center of the circle of which the above-mentioned arc is a part. This center is found at the point of intersection between a perpendicular on the center of the chord between the extreme positions of the bolt 19 and a perpendicular on the center of the chord between one of the extreme positions of the bolt 19 and the center position of the bolt 19.

I claim:

1. In a multi-furrow plow assembly wherein a plurality of plowshare mounts are supported on a frame for adjustment for plowing different width strips, by means of a hydraulic cylinder and a strut, which together with the frame and the plowshare mounts form a plurality of interacting parallelograms, with the frame being pivotally attached to a drag beam, which is connected to a tractor hitch for coupling to a tractor, the improvement comprising: a first link, one end of which being pivotally connected to said tractor hitch and the opposite end of which being pivotally connected to said frame, a second link, one end of which being pivotally connected to said strut and the opposite end of which being pivotally connected to said tractor hitch so that when the hitch is coupled to the tractor and said frame is pivoted for changing the strip width of said plow assembly, the first plowshare mount closest to said tractor hitch is displaced in a predetermined relationship with respect to the centerline of the tractor and the orientation of the plowshare mounts in relation to said centerline is maintained.

2. In a multi-furrow plow assembly as set forth in claim 1 wherein said second link comprises a turn buckle.

3. In a multi-furrow plow assembly as set forth in claim 1 wherein the point at which said opposite end of said first link is pivotally connected to the frame and the points at which said drag beam are pivotally connected to said frame and to said tractor hitch are selected and the point at which said one end of said first link is positioned on said tractor hitch is at the point of intersection of two perpendiculars drawn through the centers of two different straight lines which are drawn between three points where the pivot point of said opposite end of said first link is positioned when said plowshare mounts are manually adjusted for three different width strips.

4. In a multi-furrow plow assembly as set forth in claim 1 wherein the point at which said one end of second link is pivotally connected to said strut is selected and the point at which said opposite end of said second link is pivotally connected to said tractor hitch is positioned at the point of intersection of two perpendiculars drawn through the centers of two different straight lines drawn between three points at which the pivot point of said one end is positioned when said plow share mounts are manually adjusted for three different width strips.

* * * * *